US012784451B2

(12) United States Patent
Balouka et al.

(10) Patent No.: US 12,784,451 B2
(45) Date of Patent: Nov. 3, 2026

(54) METHOD AND SYSTEM FOR GENERATING A DESCRIPTION OF LIVE VIDEO CAPTURED BY ONE OR MORE CAMERAS

(71) Applicant: MOTOROLA SOLUTIONS, INC., Chicago, IL (US)

(72) Inventors: Nir Balouka, Tel Aviv (IL); Alex Rivkin, Tel Aviv (IL); Ariel Levy, Tel Aviv (IL); Mordeichai Glick, Tel Aviv (IL); Kenny Koay, Simpang Ampat (MY); Wei Jie Teoh, Bukit Mertajam (MY); Yung Kiok Lee, Nibong Tebal (MY); Teik Sin Tan, Bukit Mertajam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/991,776

(22) Filed: Dec. 23, 2024

(65) Prior Publication Data

US 2026/0120462 A1 Apr. 30, 2026

Related U.S. Application Data

(63) Continuation-in-part of application No. 18/929,977, filed on Oct. 29, 2024.

(51) Int. Cl.
*G06V 20/40* (2022.01)
*G10L 13/02* (2013.01)
*H04N 7/18* (2006.01)

(52) U.S. Cl.
CPC .............. *G06V 20/41* (2022.01); *G10L 13/02* (2013.01); *H04N 7/181* (2013.01)

(58) Field of Classification Search
None
See application file for complete search history.

(56) References Cited

U.S. PATENT DOCUMENTS 7,835,578 B2 11/2010 Cheng et al.
8,805,431 B2 8/2014 Vasavada et al.
(Continued)

FOREIGN PATENT DOCUMENTS

GB 2611949 B 8/2023
WO 2012142797 A1 10/2012

OTHER PUBLICATIONS

ZEE: "Guides—Top 10 Transcription Tools and Software", https://web.archive.org/web/20240424222757/https://techround.co.uk/guides/top-transcription-tools-software/, Apr. 3, 2024, all pages.
(Continued)

*Primary Examiner* — Daniel T Tekle

(57) ABSTRACT

A method and system for generating a description of live video captured by at least one camera is disclosed. The method includes actuating an automatic incident description mode in a Land Mobile Radio (LMR)-enabled system in response to a system user, attending at an incident, having inputted a corresponding initiation request in respect of the automatic incident description mode. The method also includes employing machine learning-based analytics to generate a textual description of live video captured by at least one camera located at a geographic area of the incident. The method also includes converting the textual description into at least one audio signal that matches at least a portion of content of the textual description. The method also includes transmitting the at least one audio signal, via LMR equipment of the LMR-enabled system and while the incident remains in progress, over at least one LMR communications channel.

20 Claims, 5 Drawing Sheets

(56) References Cited

U.S. PATENT DOCUMENTS

| | | | | |
|---|---|---|---|---|
| 10,768,769 | B2 | 9/2020 | Choe et al. | |
| 11,037,571 | B2 | 6/2021 | Alcock et al. | |
| 11,907,637 | B2 | 2/2024 | Ke et al. | |
| 12,014,428 | B1 * | 6/2024 | Turner | G06F 16/909 |
| 2013/0157612 | A1 * | 6/2013 | Cordero | H04N 23/698 348/36 |
| 2015/0235089 | A1 | 8/2015 | Lee et al. | |
| 2016/0105644 | A1 * | 4/2016 | Smith | G08B 13/19667 348/159 |
| 2016/0314708 | A1 * | 10/2016 | Cohain | G08B 6/00 |
| 2016/0358632 | A1 * | 12/2016 | Lakhani | H04N 9/802 |
| 2017/0263258 | A1 * | 9/2017 | Reitz | G11B 27/3045 |
| 2017/0272707 | A1 * | 9/2017 | Davis | H04N 23/60 |
| 2019/0197369 | A1 * | 6/2019 | Law | G06N 3/04 |
| 2020/0034001 | A1 * | 1/2020 | Frommelt | G06F 3/0482 |
| 2021/0232643 | A1 | 7/2021 | Ricci | |
| 2022/0171969 | A1 * | 6/2022 | Guzik | G06V 20/41 |
| 2022/0171971 | A1 * | 6/2022 | Guzik | G06N 20/00 |
| 2022/0382968 | A1 * | 12/2022 | Lim | G06T 11/60 |
| 2023/0186633 | A1 * | 6/2023 | Sim | G10L 15/26 348/143 |
| 2023/0281984 | A1 * | 9/2023 | Gustof | G06V 10/761 382/209 |
| 2023/0386212 | A1 * | 11/2023 | Singh | G06V 40/174 |
| 2024/0096053 | A1 * | 3/2024 | Norys | G06V 20/52 |
| 2024/0220850 | A1 * | 7/2024 | Ooi | G06N 20/00 |
| 2025/0069149 | A1 * | 2/2025 | Turner | G06Q 40/08 |
| 2025/0349140 | A1 * | 11/2025 | Petitpont | G06V 20/70 |
| 2025/0369729 | A1 * | 12/2025 | Abhyanker | G08B 21/02 |
| 2025/0371884 | A1 * | 12/2025 | Falik | G06N 3/0475 |

OTHER PUBLICATIONS

Astropormeai: “Gemikni Pro API: Hey Gemini! Developing a Voice-Activated Multimodal AI App”, Medium.com, https://medium.com/@astropomeai/gemini-pro-api-hey-gemini-developing-a-voice-activated-multimodal-ai-app-6cbe48215bc1, Dec. 27, 2023, all pages.

* cited by examiner

METHOD AND SYSTEM FOR GENERATING A DESCRIPTION OF LIVE VIDEO CAPTURED BY ONE OR MORE CAMERAS

RELATED U.S. APPLICATION DATA

This patent application is a Continuation-in-part of U.S. patent application Ser. No. 18/929,977 file Oct. 29, 2024, entitled "Method and System for Generating a Description of Live Video Captured By One or More Cameras", which is hereby incorporated by reference in its entirety.

BACKGROUND

When an incident is attended at by a person, or a number of people, and remains in progress, a continual flow of updated information on what is occurring in respect of the incident can be highly beneficial. For example, the updated information may reveal that the person(s) attending at the incident are becoming overwhelmed, and that timely arrival of additional person(s) (and/or drones or other deployable assistance) is likely to improve an overall outcome to the incident. Unfortunately, the negative impact of the overwhelming of person(s) attending at the incident may be further compounded by the neglect or inability of the overwhelmed person(s) to cause the updated information to be transmitted (i.e. due to their situation).

At locations of some incidents, background noise may be so loud as to significantly impair an ability of a device user to speak words into a microphone of their assigned mobile communications device. Thus, in respect of use of such a mobile communications device during times of loud noises being present in the background, a somewhat similar problem may occur as to the problem described in the previous paragraph (especially as it relates to conditions that undermine the providing of updated information).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
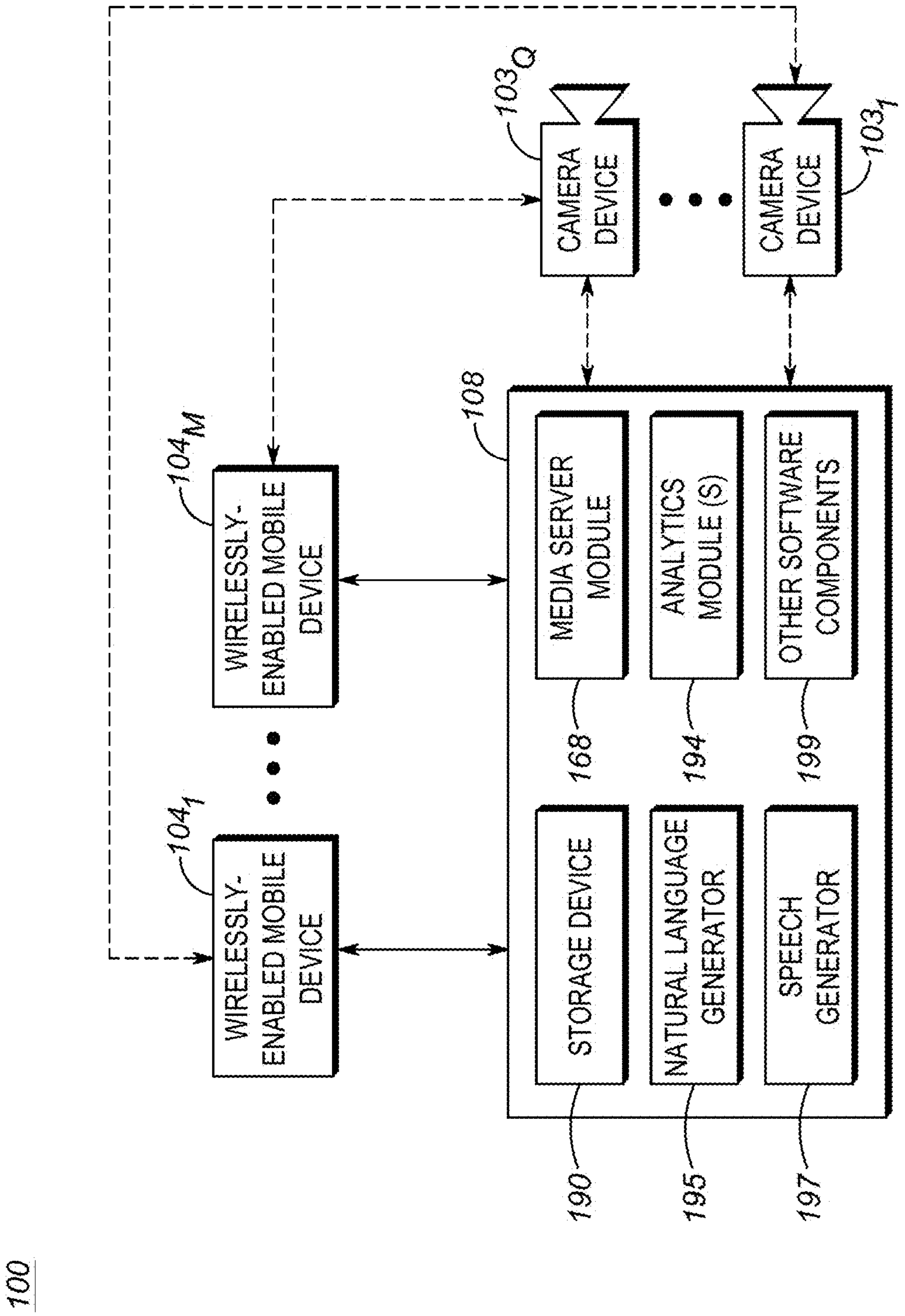
FIG. 1 is a block diagram of a Land Mobile Radio (LMR)-enabled system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method that includes actuating an automatic incident description mode in a Land Mobile Radio (LMR)-enabled system in response to a system user, attending at an incident, having inputted a corresponding initiation request in respect of the automatic incident description mode. The method also includes employing machine learning-based analytics to generate a textual description of live video captured by at least one camera located at a geographic area of the incident. The method also includes converting the textual description into at least one audio signal that matches at least a portion of content of the textual description. The method also includes transmitting the at least one audio signal, via LMR equipment of the LMR-enabled system and while the incident remains in progress, over at least one LMR communications channel.

Optionally, the method may also include causing a speaker to emit sound derived from the at least one audio signal to enable the system user to review the at least one audio signal, and optionally change it.

Optionally, the employing of the machine learning-based analytics may include recognizing a plurality of objects and detecting object behaviors, and the method may further include determining a severity score in relation to the recognized objects and the detected object behaviors, and when the severity score satisfies a threshold, a tracking of at least one object of the plurality of recognized objects may be triggered.

In accordance with another example embodiment, there is provided a system that includes at least one wirelessly-enabled mobile device configured to actuate an automatic incident description mode in a Land Mobile Radio (LMR)-enabled system in response to a system user, attending at an incident, having inputted a corresponding initiation request in respect of the automatic incident description mode. The system also includes at least one processor in communication with the at least one wirelessly-enabled mobile device. The system also includes at least one electronic storage medium storing program instructions that when executed by the at least one processor cause the at least one processor to perform generating, by machine learning-based analytics, a textual description of live video captured by at least one camera located at a geographic area of the incident. The at least one processor is also caused to perform converting the textual description into at least one audio signal that matches at least a portion of content of the textual description. The at least one processor is also caused to perform controlling transmission of the at least one audio signal, via LMR equipment of the LMR-enabled system and while the incident remains in progress, over at least one LMR communications channel.

Optionally, the at least one camera may be worn by the system user, and the system user may carry a wireless LMR device that is configured to transmit data between the at least one camera and a server.

Optionally, the at least one camera may transmit the live video to a separately housed device prior to the employing of machine learning-based analytics.

Optionally, the at least one camera may be housed together with an at least one processor in a handsfree mobile unit, and the at least one processor may generate the textual description of live video.

In accordance with yet another example embodiment, there is provided a system that includes at least one wirelessly-enabled mobile device configured to actuate an incident description mode in response to a system user, attending at an incident, having inputted a corresponding initiation request in respect of the incident description mode. The system also includes at least one processor in communication with the at least one wirelessly-enabled mobile device. The system also includes at least one electronic storage medium storing program instructions that when executed by the at least one processor cause the at least one processor to perform carrying out video analytics on live video, captured over a time period by at least one camera located at a geographic area of the incident, to recognize a plurality of objects and detect object behaviors. The at least one processor is also caused to perform determining a severity score in relation to the recognized objects and the detected object behaviors. When the severity score satisfies a threshold to trigger a tracking of at least one object of the plurality of recognized objects, the at least one processor is also caused to perform: generating, by machine learning-based analytics, a textual description of the live video; converting the textual description into at least one audio signal that matches at least a portion of content of the textual description; and controlling transmission of the at least one audio signal, via LMR equipment and while the incident remains in progress, over at least one LMR communications channel.

Optionally, the system further includes a speaker that emits sound derived from the at least one audio signal to enable the system user to review the at least one audio signal, and optionally change it.

Optionally, the system may further include at least one camera that may be worn by the system user and that is configured to capture the live video, and the system user may carry a wireless LMR device that is configured to transmit data between the at least one camera and a server.

In some example embodiments, a person unable to watch one or more videos of an incident, but nevertheless still able to listen to audio, may benefit from a live description of the one or more videos as herein described.

Each of the above-mentioned embodiments will be discussed in more detail below, starting with example system and device architectures of the system in which the embodiments may be practiced, followed by an illustration of processing blocks for achieving an improved technical method, device, and system for generating a description of live video captured by one or more cameras.

Example embodiments are herein described with reference to flowchart illustrations and/or block diagrams of methods, apparatus (systems) and computer program products according to example embodiments. It will be understood that at least some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of a Land Mobile Radio (LMR)-enabled system 100 within which methods in accordance with example embodiments can be carried out.

The LMR-enabled system 100 includes a plurality of camera devices $\mathbf{103}_1$-$\mathbf{103}_Q$ (hereinafter interchangeably referred to as "cameras $\mathbf{103}_1$-$\mathbf{103}_Q$" when referring to all of the illustrated cameras, or "camera 103" when referring to any individual one of the plurality) where Q is any suitable integer greater than one. The LMR-enabled system 100 also includes a plurality of wirelessly-enabled mobile devices 1041-104M (hereinafter interchangeably referred to as "wirelessly-enabled mobile devices 1041-104M" when referring to all of the illustrated computing devices, or "wirelessly-enabled mobile device 104" when referring to any individual one of the plurality) where M is any suitable integer greater than one. The LMR-enabled system 100 also includes a server 108. In some examples, the server 108 may be remote from the geographic area of an incident where live video is being (or will begin to be) captured. In some examples, part or all of the implementation of the server 108 may be cloud-based.

In some example embodiments, the wirelessly-enabled mobile device 104 is a selected one or more of the following: a handheld device such as, for example, a tablet, a phablet, a smart phone or a personal digital assistant (PDA); a laptop computer; a smart television; a two-way radio; and other suitable devices. With respect to the server 108, this could comprise a single physical machine or multiple physical machines. It will be understood that the server 108 need not be contained within a single chassis, nor necessarily will there be a single location for the server 108. As will be appreciated by those skilled in the art, at least some of the functionality of the server 108 can be implemented outside of the server 108, within an edge device or other device. For example, at least some of the functionality of the server 108 can be implemented within the wirelessly-enabled mobile device 104 rather than within the server 108.

The wirelessly-enabled mobile device 104 communicates with the server 108 through one or more networks. These networks can include the Internet, or one or more other public/private networks coupled together by network switches or other communication elements. The networks could be any of the following: a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. In some examples, the wirelessly-enabled mobile device 104 communicates directly or indirectly with other parts of LMR-enabled system 100 besides the server 108. For instance, it is contemplated that the wirelessly-enabled mobile device 104 may communicate directly or indirectly with one or more of the cameras $\mathbf{103}_1$-$\mathbf{103}_Q$.

Figure 2:
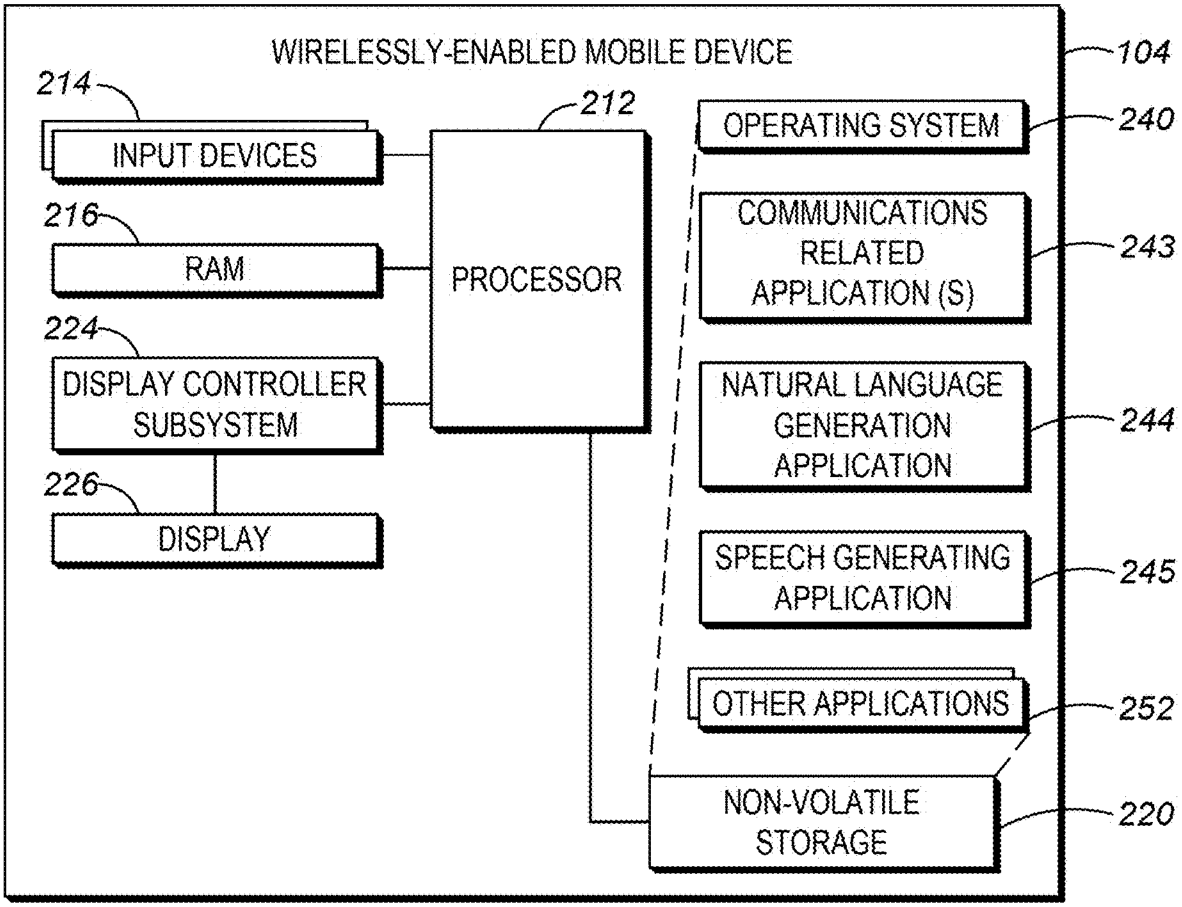
FIG. 2 is a block diagram showing more detail of one of the wirelessly-enabled mobile devices shown in FIG. 1.

More details of the wirelessly-enabled mobile device 104 are shown in FIG. 2. The wirelessly-enabled mobile device 104 includes at least one processor 212 that controls the overall operation of the device. The processor 212 interacts with various subsystems such as, for example, input devices 214 (such as a selected one or more of a keyboard, mouse, touch pad, physical button(s), physical knob(s), roller ball and voice control means, for example), random access memory (RAM) 216, non-volatile storage 220, display controller subsystem 224 and other subsystems. The display controller subsystem 224 interacts with display 226 and it renders graphics and/or text upon the display 226.

Still with reference to the wirelessly-enabled mobile device 104 shown in FIG. 2, operating system 240 and various software applications used by the processor 212 are stored in the non-volatile storage 220. The non-volatile storage 220 is, for example, one or more hard disks, solid state drives, or some other suitable form of computer readable medium that retains recorded information after the wirelessly-enabled mobile device 104 is turned off. Regarding the operating system 240, this includes software that manages computer hardware and software resources of the wirelessly-enabled mobile device 104 and provides common services for computer programs. Also, those skilled in the art will appreciate that the operating system 240, communications related application(s) 243, natural language generating application 244 (which may be provided in alternative to the natural language generator 195, performing a similar function), speech generating application 245 (which may be provided in alternative to the speech generator 197, performing a similar function), and other applications 252, or parts thereof, may be temporarily loaded into a volatile store such as the RAM 216. The processor 212, in addition to its operating system functions, can enable execution of the various software applications on the wirelessly-enabled mobile device 104.

Regarding the communications related application(s) 243, these can include any one or more of, for example, an email application, an instant messaging application, a talk group application, etc.

Referring once again to FIG. 1, the server 108 includes several software components for carrying out other functions of the server 108. For example, the server 108 includes a media server module 168. The media server module 168 handles client requests related to storage and retrieval of security video taken by camera devices $\mathbf{103}_1$-$\mathbf{103}_q$ in the LMR-enabled system 100. In some examples, the media server module 168 may carry out other functions in relation to other forms of media communicated to the wirelessly-enabled mobile device 104 from the server 108. The server 108 also includes server-side analytics module(s) 194 which can include, in some examples, any suitable one of known commercially available software that carry out computer vision related functions (complementary to any video analytics performed in the cameras) as understood by a person of skill in the art. The server-side analytics module(s) 194 can also include software for carrying out non-video analytics, such as audio analytics that may, for example, convert spoken words into text, carry out audio emotion recognition, etc. In some examples, the server-side analytics modules(s) 194 may generate metadata in real-time (or near real-time) relative to capturing of video or other types of sensor data.

The server 108 also includes a natural language generator 195. The natural language generator 195 may receive image and/or video metadata from, for example, the analytics module 194, and then process this metadata to produce textual data more directly intelligible to humans such as, for instance, sentences in English or some other language.

The server 108 also includes a speech generator 197. The speech generator 197 converts text to audible, computer-generated speech using conventional techniques. To put it another way, the speech generator 197 generates digital audio corresponding to the provided text. As will be understood by those skilled in the art, the speech generator 197 may, for example, include a speech synthesizer and/or a table of recorded speech snippets paired with text stored in a database (for example, a database maintained within the storage device 190). The speech may be generated by, for instance, concatenating snippets of recorded speech that correspond to the supplied text.

The server 108 also includes a number of other software components 199. These other software components will vary depending on the requirements of the server 108 within the overall system. As just one example, the other software components 199 might include special test and debugging software, or software to facilitate version updating of modules within the server 108. The other software components 199 may also include one or more server-side modules that provide cooperative counterpart functionality to the communications related application(s) 243 (previously herein described) and/or some other application(s) stored in the non-volatile storage 220 of the wirelessly-enabled mobile device 104.

Regarding the at least one storage device 190, this comprises, for example, organized information structures to provide organized storing of recorded security video, non-video sensor data, incident-related data, audio data, video metadata, audio metadata, Global Positioning System (GPS) location metadata, etcetera.

Still with reference to FIG. 1, the camera 103 is operable to capture a plurality of images and produce image data representing the plurality of captured images. The camera 103, an image capturing device, may include, for example, a security video camera, a mobile video camera wearable by a person, a mobile video camera installed in a vehicle, or some other type of fixed or mobile camera. Furthermore, it will be understood that the LMR-enabled system 100 includes any suitable number of cameras (i.e. Q is any suitable integer greater than zero). In at least one example where the camera 103 is a wearable mobile video camera, the hardware and software components of both the camera 103 and the wirelessly-enabled mobile device 104 may each be contained in separate housings.

Figure 3:
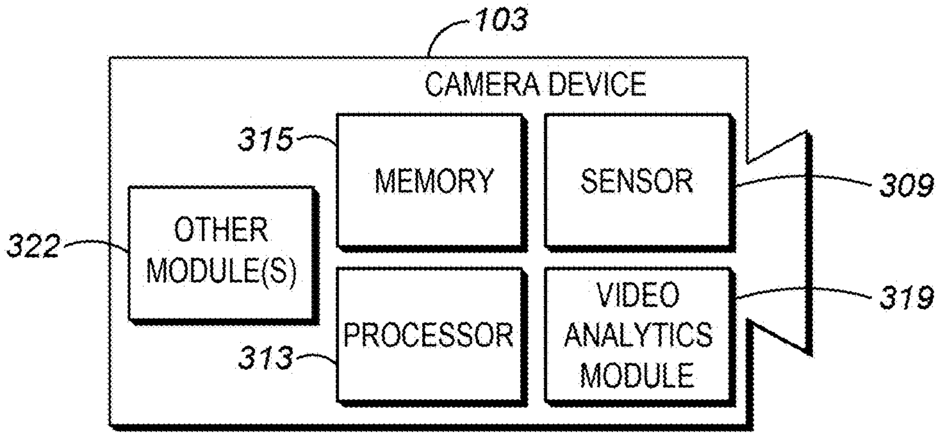
FIG. 3 is a block diagram showing more detail of one of the cameras shown in FIG. 1.

More details of the camera 103 are shown in FIG. 3. The camera 103 includes an image sensor 309 for capturing a plurality of images. The camera 103 may be a digital video camera and the image sensor 309 may output captured light as a digital data. For example, the image sensor 309 may be a CMOS, NMOS, or Charge-Couple Device (CCD). The illustrated camera 103 may be a 2D camera; however use of a structured light 3D camera, a time-of-flight 3D camera, a 3D Light Detection and Ranging (LiDAR) device, a stereo camera, or any other suitable type of camera within the LMR-enabled system 100 is contemplated. In some example embodiments, the camera 103 may be a fixed-location security camera installed proximate or within the geographic area of an incident such that a Field Of View (FOV) of the camera 103 is at least partly overlapping the geographic area of the incident.

The image sensor 309 may be operable to capture light in one or more frequency ranges. For example, the image sensor 309 may be operable to capture light in a range that substantially corresponds to the visible light frequency range. In other examples, the image sensor 309 may be operable to capture light outside the visible light range, such as in the infrared and/or ultraviolet range. In other examples, the camera 103 may have characteristics such that it may be described as being a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Body Worn Camera (BWC), an in-car vehicle camera, a pan-tilt-zoom camera, a dome camera, an in-ceiling camera, a box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone or physical access control device.

In addition to the image sensor 309 already described, the camera 103 also includes one or more processors 313, one or more video analytics modules 319, and one or more memory devices 315 coupled to the processors and one or more network interfaces. Regarding the video analytics module 319, this generates metadata outputted to the server 108. The metadata can include, for example, records which describe various detections of objects such as, for instance, pixel locations for the detected object in respect of records for the camera within which the respective metadata is being generated.

Regarding the memory device 315 within the camera 103, this can include a local memory (such as, for example, a random access memory and a cache memory) employed during execution of program instructions. Regarding the processor 313, this executes computer program instructions (such as, for example, an operating system and/or software programs), which can be stored in the memory device 315.

In various embodiments the processor 313 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 313, may be combined together on one semiconductor chip. For example, the processor 313, the memory device 315 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 315 coupled to the processor 313 is operable to store data and computer program instructions. The memory device 315 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 315 may be operable to store in memory (including store in volatile memory, non-volatile memory, dynamic memory, etc. or any combination thereof).

The illustrated camera 103 also includes other module(s) 322. The other module(s) 322 may include modules that operate as an alternative to (or in combination with) applications that may be installed within the wirelessly-enabled mobile device 104, for example, a communications related module providing similar functionality to the communications related application(s) 243, a natural language generation module providing similar functionality to the natural language generation application 244, etc.

As shown in FIG. 1, the camera 103 is coupled to the server 108. In some examples, the camera 103 is coupled to the server 108 via one or more suitable networks. For instance (and not by way of limitation) the camera 103 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the camera 103 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The camera 103 may include any suitable interface for any one or more of these networks, where appropriate.

Figure 4:
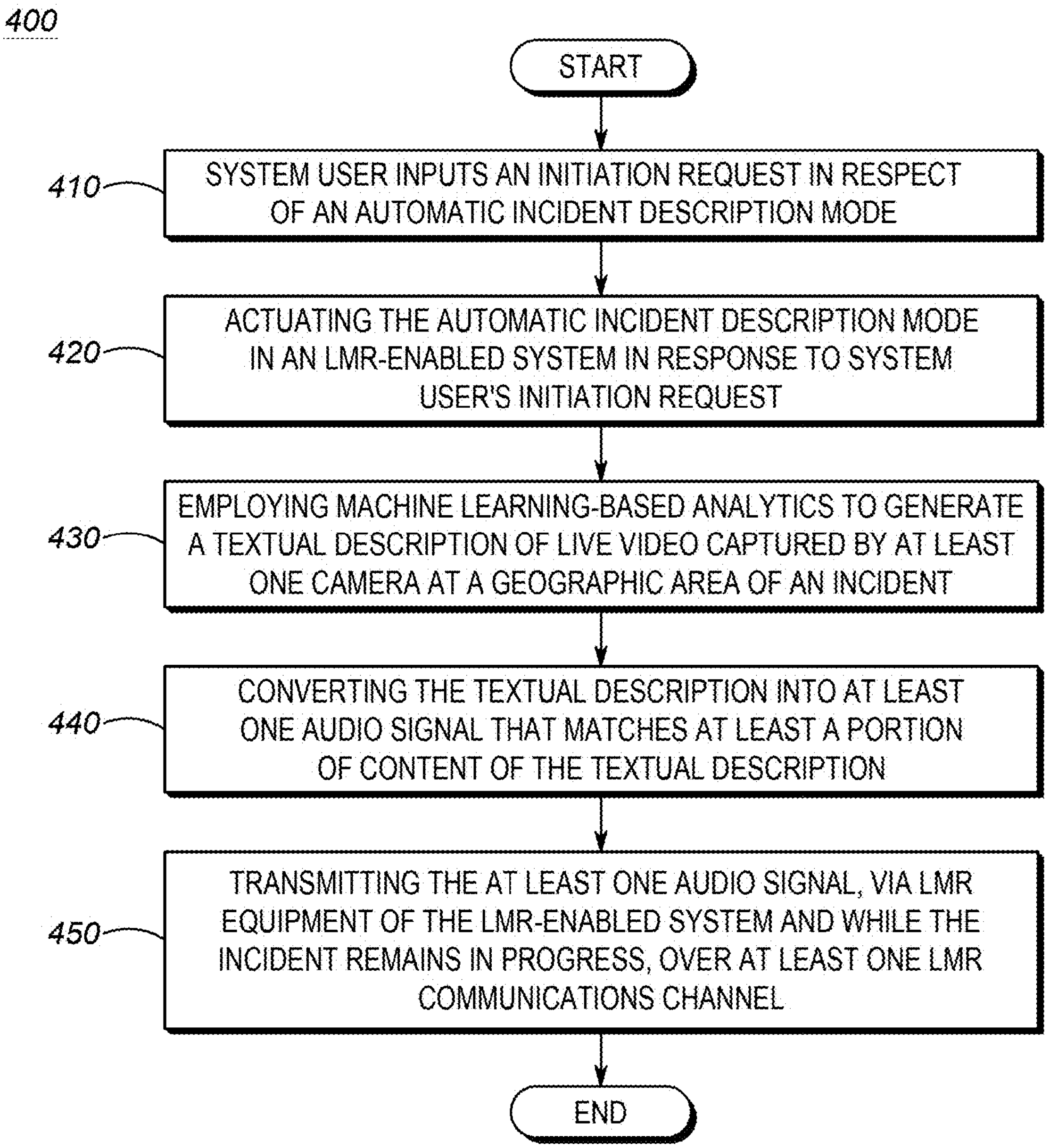
FIG. 4 is a flow chart illustrating a method in accordance with an example embodiment.

Reference is now made to FIG. 4. FIG. 4 is a flow chart illustrating a method 400 in accordance with an example embodiment.

The illustrated method 400 includes a system user inputting (410) an initiation request in respect of an automatic incident description mode. In some examples, this may include the system user operating one or more of the input devices 214 of the wirelessly-enabled mobile device 104 such as, for instance, pushing a button or voice-actuated input.

Next the illustrated method 400 of FIG. 4 includes actuating (420) an automatic incident description mode in a Land Mobile Radio (LMR)-enabled system in response to the system user's initiation request. In at least one example, the action 420 may include a handshake protocol carried out between devices (such as, for example, initiation and establishment of a communications path between the camera 103 and the wirelessly-enabled mobile device 104). In at least one alternative example, the communications path may instead be initiated and established by carrying out a handshake protocol between the camera 103 and the server 108.

Next the illustrated method 400 of FIG. 4 includes employing machine learning-based analytics (430) to generate a textual description of live video captured by at least one camera located at a geographic area of the incident. In some examples, the action 430 is carried out within the server 108 by one or more of the analytics modules 194 in combination with the natural language generator 195. In other alternative examples, the action 430 is carried out within both the wirelessly-enabled mobile device 104 and the camera 103 by the video analytics module 319 in combination with the natural language generating application 244. In still other alternative examples, the action 430 is carried out within both the wirelessly-enabled mobile device 104 and the server 108 by one or more of the analytics modules 194 in combination with the natural language generating application 244. In still other alternative examples, the action 430 is carried out within both the camera 103 and the server 108 by the natural language generator 195 in combination with the video analytics module 319.

In the case where the textual description corresponds to live video being captured by more than one camera, the textual description may include a first portion relating to a first camera, and a second portion relating to a second camera different than the first camera, etc. In such examples, the method 400 may also include deriving a revised, overall textual description by combining at least both the first and second portions (and any additional portions) of the textual descriptions into consolidated content for the at least one audio signal. Also in the case where a plurality of cameras are involved, it is contemplated that capturing of video may begin automatically without requiring that initiation requests in respect of the automatic incident description mode be received from all the different system users. For example, a second camera may begin automatically capturing a respective portion of the live video in response to the initiation request originating from a first camera that is located in a different location than the second camera.

Next the illustrated method 400 of FIG. 4 includes converting (440) the textual description into at least one audio signal that matches at least a portion of content of the textual description. In some examples, the action 440 is carried out by the speech generator 197 of the server 108. In other alternative examples, the action 440 is carried out by the speech generating application 245 of the wirelessly-enabled mobile device 104.

Next the illustrated method 400 of FIG. 4 includes transmitting (450) the at least one audio signal, via LMR equipment of the LMR-enabled system and while the incident remains in progress, over at least one LMR communications channel (i.e. taking the form of a Push-To-Talk communication). Also, it is contemplated that the action 450 may be carried out automatically, which may beneficially allow a user of the wirelessly-enabled mobile device 104 to effectively have that device operating in a quasi-"hands free" mode so that the user's hand may be fully available for other tasks while an incident progresses.

Figure 5:
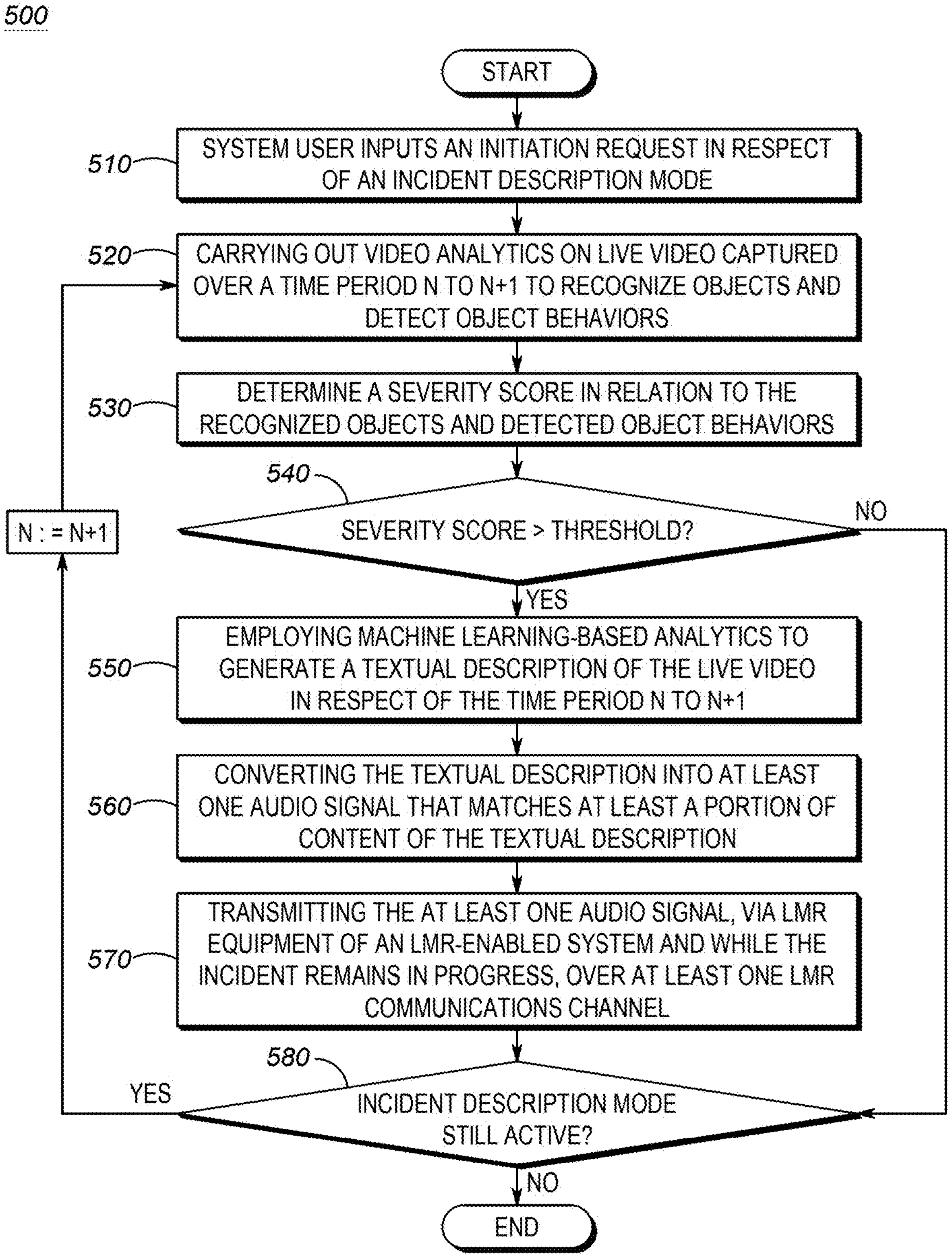
FIG. 5 is a flow chart illustrating another method in accordance with an example embodiment.
Figure 6:
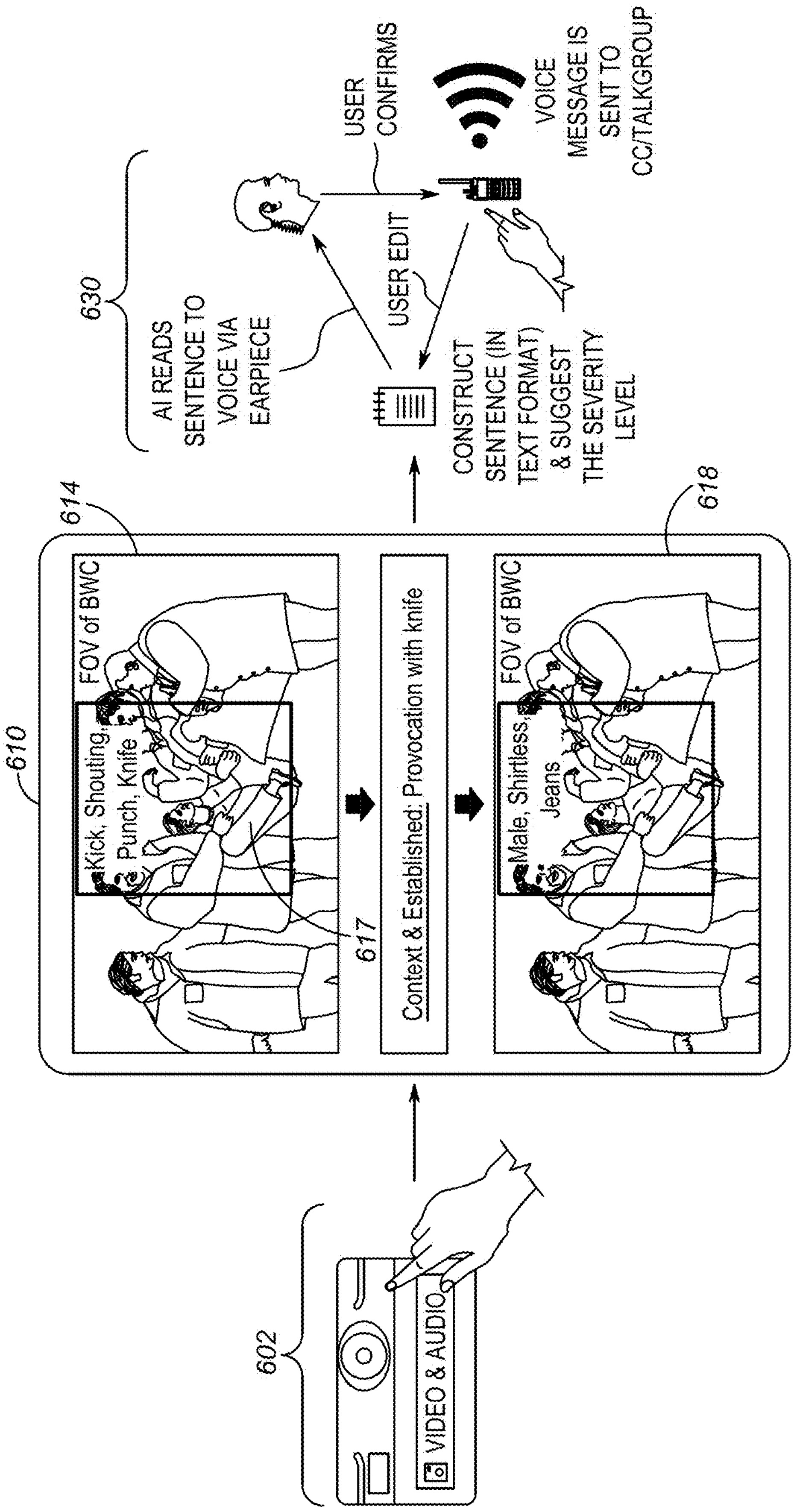
FIG. 6 is a diagram providing additional example detail in relation to the method illustrated in FIG. 5.

Reference is now made to FIGS. 5 and 6. FIG. 5 is a flow chart illustrating another method 500 in accordance with an example embodiment. FIG. 6 is a diagram providing additional example detail in relation to the method illustrated in FIG. 5.

The illustrated method 500 includes a system user inputting (510) an initiation request in respect of an incident description mode. For example, in FIG. 6 example user action 602, a person pressing one or more input button(s) on a BWC, corresponds to the action 510. Also, it will be understood that the BWC shown in FIG. 6 is an example of the camera 103 (FIG. 1).

Next the illustrated method 500 of FIG. 5 includes carrying out video analytics (520) on live video captured (e.g. video captured by at least one camera of the cameras $103_1$-$103_Q$ located at a geographic area of an incident) over a time period n to n+1 to recognize objects and detect object behaviors. For example, the analytics module(s) 194 (FIG. 1) and/or the analytics module 319 may implement depicted video analytics sub-actions 610 in FIG. 6 include a first sub-action 614 where video analytics detects that person 617 is exhibiting aggressive behaviors. In at least one example, machine learning is employed to generate, in respect of the current time period of video corresponding to the representative image, a context from the detected behaviors of interest (for instance, aggressive behaviors or unusual behaviors) and/or any dangerous accessory objects being carried by or otherwise connected to a primary object. In respect of what is illustrated in FIG. 6, the latter is "kicking, shouting, knife, punching" and the context generated from this is "provocation with knife". In another example, all of the above may be something different such as, for instance, "lie down, sleeping, motionless" for behaviors and "unconscious" for generated context.

Continuing on, a second sub-action 618 follows the first sub-action 614, occurring after a determination that the person 617 is the primary describable object for a verbal description focus. For the second sub-action 618, video analytics completes an objection recognition of the person 617, including generating video metadata that facilitates an appearance description of the person 617.

In at least one alterative example, video analytics as described above can be combined with analyzing of intentional hand gestures made in front of a lens of the camera 103. (For instance, a particular pattern of raised and lowered fingers on a hand might translate into say a message that additional back up is needed at the observed incident location.) If hand gesture(s) are carried out in this manner, a sub-action of the action 520 would be a deciphering of a meaning of the hand gesture by the video analytics and combining that meaning into the overall information obtained during the action 520 of the method 500.

Next the illustrated method 500 of FIG. 5 includes determining (530) a severity score in relation to the recognized objects and the detected object behaviors. In at least one example, more concerning object accessories and object behaviors contribute more to increasing the severity score than less concerning object accessories and object behaviors. For instance, recognizing a gun being carried by a person may contribute a higher amount to the severity score than recognizing a hockey stick being carried by a person. Similarly, detecting a person moving fist(s) in a manner consistent with punching may contribute a higher amount to the severity score than detecting a person shouting.

Next in the illustrated method 500 is decision action 540 where an assessment is made as to whether the determined severity score satisfies a threshold (for example, exceeds a threshold). If no, then no further actions are carried out in respect of the video of the current time period being processed. If yes, then next machine learning-based analytics is employed (550) to generate a textual description of the live video in respect of the time period n to n+1. In at least one example, a sentence generated by natural language generator 195 (FIG. 1) and/or the natural language generation application 244 (FIG. 2) may take the following form: <interesting detected object>+<object description>+<behavior type>+<location>. In some other example, the generated sentence may take some other form.

Next the illustrated method 500 of FIG. 5 includes converting (560) the textual description into at least one audio signal that matches at least a portion of content of the textual description. The action 560 may be implemented by, for example, the speech generator 197 (FIG. 1) and/or the speech generating application 245 (FIG. 2). In at least one example, the actions 550 and 560 can collectively include a further sub-action of iterative human review of the machine learning-generated description to ensure suitability and possibly provide for manual human correction (if appropriate). This is depicted in FIG. 6 (i.e. reference numeral 630). In at least one example, ear phones may allow the human reviewer to more clearly listen to the proposed description (prior to below described transmission) in an environment with loud background noise. If editing of the textual description is desired, one or more of the input devices 214 of the wirelessly-enabled mobile device 104 may be operated to effect changes (for example, one or more button(s) may be operated to move through a list of suggested replacement words at a word position where a change is desired). Once the description is satisfactory, user input can affirmatively confirm this (for example, by suitable tactile interaction with a Push-To-Talk button on a two-way radio).

Next the illustrated method 500 of FIG. 5 includes transmitting (570) the at least one audio signal, via LMR equipment of an LMR-enabled system and while the incident remains in progress, over at least one LMR communications channel.

Next the illustrated method 500 is decision action 580 where an assessment is made as to whether the incident description mode is still active. If yes, then the actions 520-570 are repeated over the next time period. If no, then the method 500 ends.

It is also contemplated that priorities can be established to avoid a conflict of two competing audios needing the LMR communications channel at the same time. The description audio of the incident may or may not have priority over other system users that wish to talk on the LMR communications channel. This priority scheme for the description audio may or may not be handled the same as a person talking where priority is assigned.

Users of other devices of the wirelessly-enabled mobile devices 1041-104M may listen in to the transmitted audio signal so that can responsively take certain actions (such as, for example, sending back up assistance, changing/updating a categorization of an incident, etcetera) when appropriate to do so based on the information contained in the transmitted audio signal (which may be reviewed together with other available information that the other users possess or have access to).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot actuate an automatic incident description mode in an LMR-enabled system, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

actuating an automatic incident description mode in a Land Mobile Radio (LMR)-enabled system in response to a system user, attending at an incident, having inputted a corresponding initiation request in respect of the automatic incident description mode;

employing machine learning-based analytics to generate a textual description of live video captured by at least one camera located at a geographic area of the incident;

converting the textual description into at least one audio signal that matches at least a portion of content of the textual description; and transmitting the at least one audio signal, via LMR equipment of the LMR-enabled system and while the incident remains in progress, over at least one LMR communications channel, wherein the textual description is derived in part from video metadata of at least one tracked object shown in the live video.

2. The method of claim 1 wherein the at least one camera is at least one of one or more Body Worn Cameras (BWCs), one or more in-car vehicle cameras, and one or more fixed-location security cameras.

3. The method of claim 1 wherein the textual description includes a first portion relating to a first camera of the at least one camera, and a second portion relating to a second camera of the at least one camera different than the first camera.

4. The method of claim 3 further comprising deriving a revised, overall textual description by combining at least both the first and second portions of the textual descriptions into consolidated content for the at least one audio signal.

5. The method of claim 3 wherein the second camera begins automatically capturing a respective portion of the live video in response to the initiation request originating from a different location than the second camera.

6. The method of claim 1 wherein the at least one camera is worn by the system user, and the system user carries a wireless LMR device that is configured to transmit data between the at least one camera and a server.

7. The method of claim 6 wherein the at least one camera transmits the live video to a separately housed device prior to the employing of machine learning-based analytics.

8. The method of claim 6 wherein the at least one camera is housed together with an at least one processor in a handsfree mobile unit, and the at least one processor generates the textual description of the live video.

9. The method of claim 1 wherein the employing of the machine learning-based analytics to generate the textual description is carried out in a server remote from the geographic area of the incident.

10. The method of claim 1 wherein the LMR equipment of the LMR-enabled system is remote from the geographic area of the incident.

11. The method of claim 1 further comprising operating a plurality of wireless LMR devices that each receive the at least one audio signal.

12. A system comprising:

at least one wirelessly-enabled mobile device configured to actuate an automatic incident description mode in a Land Mobile Radio (LMR)-enabled system in response to a system user, attending at an incident, having inputted a corresponding initiation request in respect of the automatic incident description mode;

at least one processor in communication with the at least one wirelessly-enabled mobile device; and at least one electronic storage medium storing program instructions that when executed by the at least one processor cause the at least one processor to perform:

generating, by machine learning-based analytics, a textual description of live video captured by at least one camera located at a geographic area of the incident;

converting the textual description into at least one audio signal that matches at least a portion of content of the textual description; and controlling transmission of the at least one audio signal, via LMR equipment of the LMR-enabled system and while the incident remains in progress, over at least one LMR communications channel, wherein the textual description of the generating is derived in part from video metadata of at least one tracked object shown in the live video.

13. The system of claim 12 further comprising the at least one camera that is at least one of one or more Body Worn Cameras (BWCs), one or more in-car vehicle cameras, and one or more fixed-location security cameras.

14. The system of claim 13 wherein the at least one camera is worn by the system user, and the at least one wirelessly-enabled mobile device is a wireless LMR device configured to:

be carried by the system user, and transmit data between the at least one camera and a server.

15. The system of claim 14 wherein the at least one camera is configured to transmit the live video to a separately housed device prior to employing of the machine learning-based analytics.

16. The system of claim 14 wherein the at least one camera is housed together with the at least one processor in a handsfree mobile unit.

17. The system of claim 12 further comprising:

a first camera of the at least one camera; and a second camera of the at least one camera different than the first camera, wherein the textual description includes a first portion relating to the first camera, and a second portion relating to the second camera.

18. The system of claim 17 wherein the second camera is configured to begin automatically capturing a respective portion of the live video in response to the initiation request originating from a different location than the second camera.

19. The system of claim 12 wherein the LMR equipment of the LMR-enabled system is remote from the geographic area of the incident.

20. A system comprising:

at least one wirelessly-enabled mobile device configured to actuate an incident description mode in response to a system user, attending at an incident, having inputted a corresponding initiation request in respect of the incident description mode;

at least one processor in communication with the at least one wirelessly-enabled mobile device; and at least one electronic storage medium storing program instructions that when executed by the at least one processor cause the at least one processor to perform:

carrying out video analytics on live video, captured over a time period by at least one camera located at a geographic area of the incident, to recognize a plurality of objects and detect object behaviors;

determining a severity score in relation to the recognized objects and the detected object behaviors; and when the severity score satisfies a threshold to trigger a tracking of at least one object of the plurality of recognized objects:

generating, by machine learning-based analytics, a textual description of the live video;

converting the textual description into at least one audio signal that matches at least a portion of content of the textual description; and controlling transmission of the at least one audio signal, via LMR equipment and while the incident remains in progress, over at least one LMR communications channel.

* * * * *